US006819748B2

(12) United States Patent
Weiss et al.

(10) Patent No.: US 6,819,748 B2
(45) Date of Patent: Nov. 16, 2004

(54) MENUING METHOD AND SYSTEM

(75) Inventors: David L. Weiss, Glen Allen, VA (US); Patrick L. Jernigan, Manakin Sabot, VA (US); William S. Bass, Richmond, VA (US); Shannon Nicole Easley, Richmond, VA (US)

(73) Assignee: Capital One Financial Corporation, Falls Church, VA (US)

( * ) Notice: Subject to any disclaimer, the term of this patent is extended or adjusted under 35 U.S.C. 154(b) by 0 days.

(21) Appl. No.: 09/966,548

(22) Filed: Sep. 27, 2001

(65) Prior Publication Data

US 2003/0059008 A1 Mar. 27, 2003

(51) Int. Cl.[7] ......................... H04M 1/64; H04M 11/00; G06F 17/60
(52) U.S. Cl. ................. 379/93.12; 379/88.23; 705/35; 705/38
(58) Field of Search ................ 379/88.19–88.23, 379/917, 93.12, 114.16, 142.04, 142.05, 142.06; 705/35, 38, 75, 39

(56) References Cited

U.S. PATENT DOCUMENTS

| 5,341,414 | A | * | 8/1994 | Popke | 379/142.14 |
|---|---|---|---|---|---|
| 5,818,908 | A | * | 10/1998 | Kaplan | 379/88.21 |
| 5,946,377 | A | * | 8/1999 | Wolf | 379/88.22 |
| 5,950,179 | A | * | 9/1999 | Buchanan et al. | 705/38 |
| 6,016,336 | A | * | 1/2000 | Hanson | 379/88.23 |
| 6,061,433 | A | * | 5/2000 | Polcyn et al. | 379/93.12 |
| 6,105,007 | A | * | 8/2000 | Norris | 705/38 |
| 6,122,625 | A | * | 9/2000 | Rosen | 705/35 |
| 6,370,238 | B1 | * | 4/2002 | Sansone et al. | 379/88.23 |
| 6,519,576 | B1 | * | 2/2003 | Freeman | 706/21 |
| 6,584,181 | B1 | * | 6/2003 | Aktas et al. | 379/88.23 |
| 2001/0014146 | A1 | * | 8/2001 | Beyda et al. | 379/88.25 |
| 2002/0073024 | A1 | * | 6/2002 | Gilchrist | 705/39 |
| 2002/0184103 | A1 | * | 12/2002 | Shah et al. | 705/26 |
| 2003/0050885 | A1 | * | 3/2003 | Cohen et al. | 705/37 |
| 2003/0074328 | A1 | * | 4/2003 | Schiff et al. | 705/75 |
| 2003/0097342 | A1 | * | 5/2003 | Whittingtom | 705/75 |

* cited by examiner

Primary Examiner—Fan Tsang
Assistant Examiner—Joseph T Phan
(74) Attorney, Agent, or Firm—Baker & McKenzie

(57) ABSTRACT

A method and system for menuing on a voice response unit (VRU) or the like that avoids creating customer confusion on low volume calls that results in customer service representatives having to spend time clearing up that confusion without otherwise adversely affecting the system. For example, a menu for non-bankruptcy reaffirmation account and the like is included in the menus of a credit card VRU system. The menu and its sub-menus eliminate the options of balance transfers and credit limit increases that are inapplicable to those customers and result in an inordinate number of lengthy conversations.

1 Claim, 5 Drawing Sheets

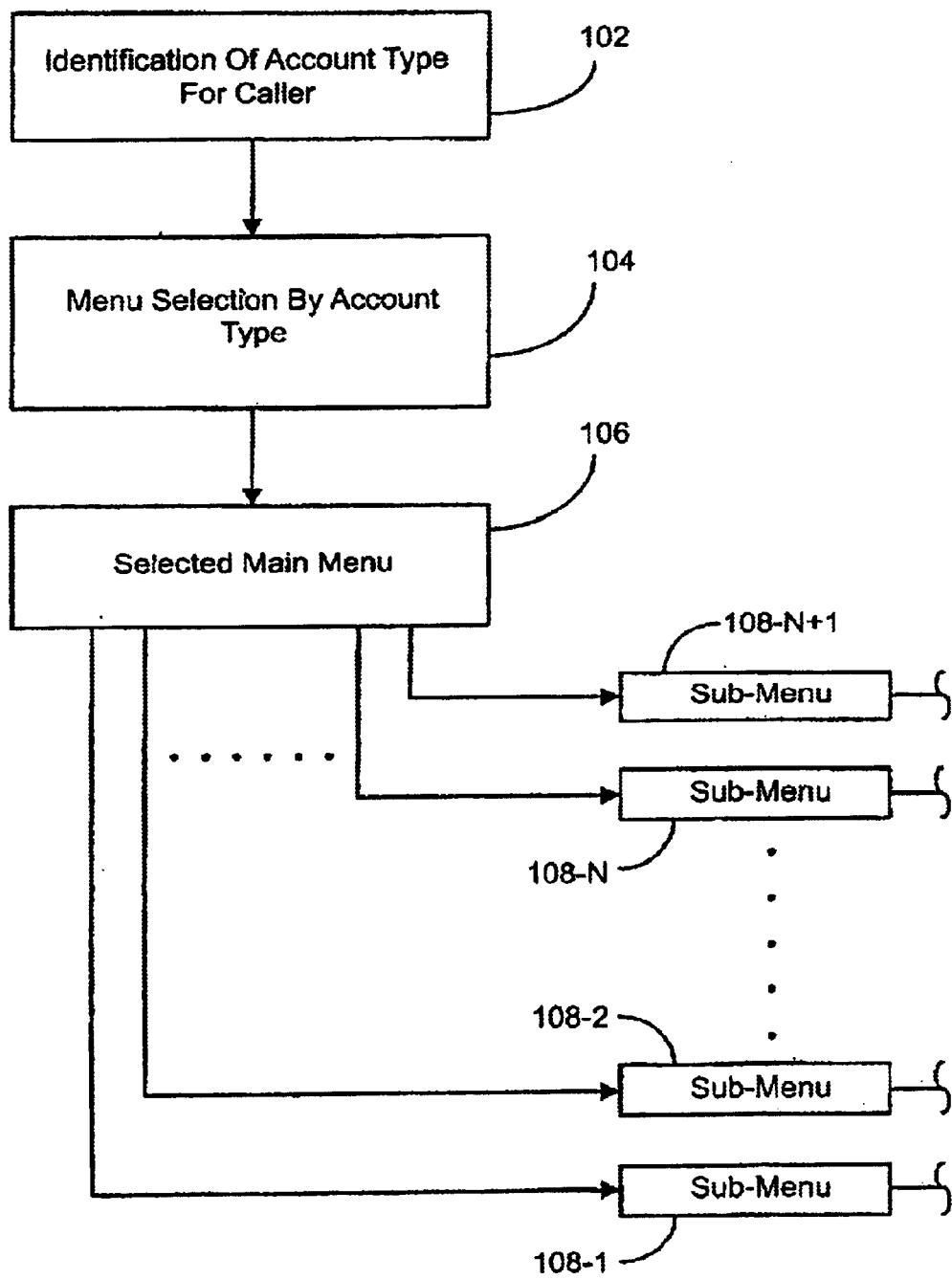

FIG. 3
PRIOR ART

| High Response Main Menu |
|---|
| 1: Automated Options<br>2: Credit Limit Increase<br>3: Lost/Stolen Cards or Close Account<br>4: Customer Relations Questions<br>5: Repeat Options<br>6: Change Messaging to Spanish |

FIG. 4
PRIOR ART

| Automated Options<br>Sub-Menuu |
|---|
| 1: Balance Inquiry<br>2: Current transactions<br>3: Balance Transfer<br>4: Statement Request<br>5: Repeat Options<br>6: Return to NBR Main Menu |

MENUING METHOD AND SYSTEM

FIELD OF THE INVENTION

The present invention relates generally to menuing methods and systems that include low call volume menus and high call volume menus and, more particularly, to menuing methods and systems that provide an additional menu for low call volume non-bankruptcy reaffirmation and related kinds of accounts among a plurality of high call volume menus.

BACKGROUND

Voice response unit (VRU) systems enable callers to access information using a conventional telephone or another communication device. The interaction between the callers and the VRU system includes various voice prompts output by the VRU system and responses thereto, for example, via the telephone keypad, by the caller. VRU systems are used by service providers, such as banks and credit card companies, to fully or partially automate telephone call answering or responding to queries. Typically a VRU system provides the capability to play voice prompts including recorded voice segments or speech synthesized from text and to receive responses thereto. The voice prompts are generally organized in the form of voice menus invoked by state tables. A state table can access and play a voice segment or synthesize speech from a given text. The prompts are usually part of a voice application that is designed to, for example, allow a caller to query information associated with their various accounts.

Further, VRU systems are used in a variety of applications today to resolve customer problems and questions in conjunction with customer service representatives. In a financial service industry, such as the credit card industry, VRU systems often provide callers general information via one or more automated messages about a credit card account. Usually, the user is also given the option to either bypass an automated message or after the automated message has concluded to interact with a customer service representative in order to receive more detailed information tailored to an account of the user. This is achieved through the use of menus that provide a list of options for selection by the caller. The VRU system menus are organized such that high volume calls are handled so as to minimize costs associated with customer service representatives and to increase customer satisfaction. Naturally, there is a continuing desire to improve VRU systems to improve cost performance and to enhance customer satisfaction.

SUMMARY OF THE INVENTION

An aspect of the invention is to provide a menuing method including entering an identifier, and selecting a menu from a plurality of menus based upon the identifier. The plurality of menus includes at least one low call volume menu and at least one high call volume menu.

Another aspect of the invention is to provide a menu driven system including a menu selector that selects a menu from a plurality of menus based upon an identifier. The plurality of menus includes at least one low call volume menu and at least one high call volume menu.

Another aspect of the invention is to provide a menuing method for a voice response unit system including entering an identifier, and selecting a menu from a plurality of menus based upon the identifier. The plurality of menus includes at least one low call volume menu and at least one high call volume menu, and the at least one low call volume menu excludes an increasing credit limits option and a transferring balances option if the identifier is associated with non-bankruptcy reaffirmation accounts.

BRIEF DESCRIPTION OF THE DRAWINGS

FIG. 2 illustrates a block diagram of a portion of a prior art VRU system;

FIG. 3 illustrates a prior art High Response Main Menu that can be used in FIG. 2;

FIG. 4 illustrates a prior art Automated Options Sub-Menu of the High Response Main Menu of FIG. 3;

DETAILED DESCRIPTION

Figure 1:
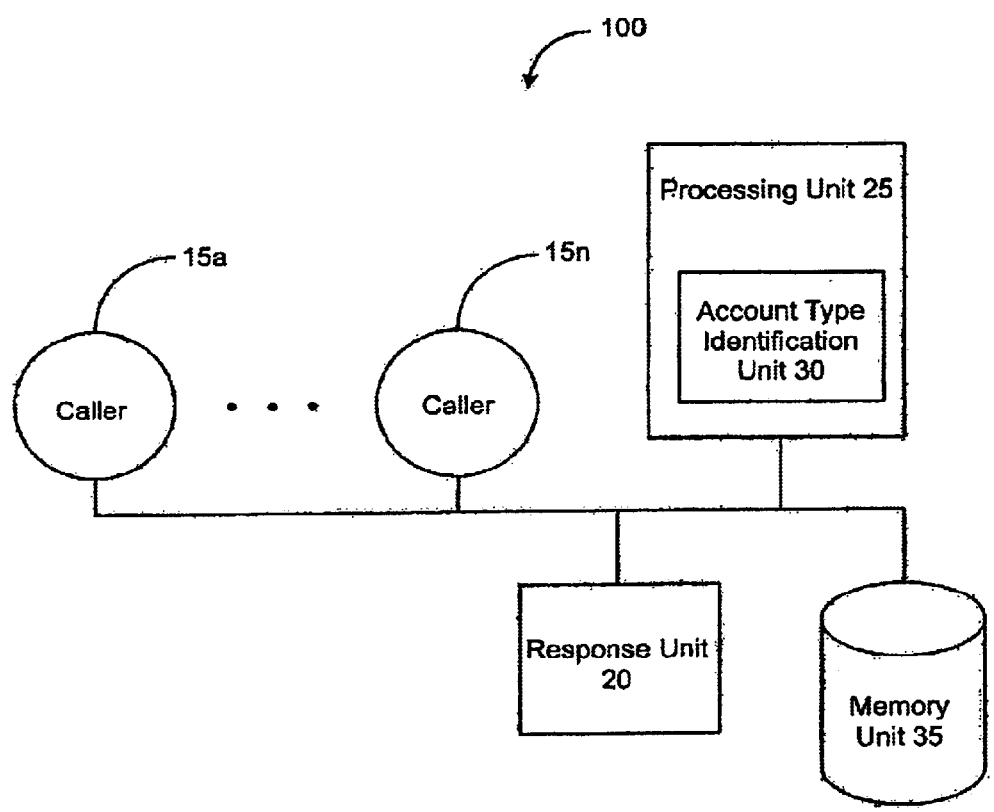
FIG. 1 is a prior art VRU system.

FIG. 1 is a prior art VRU system 100 including one or more Callers 15a . . . 15n, a Response Unit 20, a Processing Unit 25 including Account Type Identification Unit 30 and Memory Unit 35. In an exemplary embodiment, Callers 15a . . . 15n are individuals using communication devices, such as wired or wireless telephones and/or network connections, for example, Internet connections, via a wireless or wired transmission link to transmit information to and to receive information from Response Unit 20. Other communication devices can be used by Callers 15a . . . 15n as well. The Processing Unit 25 can be a server, a computer processing unit or the like. The Processing Unit 25 includes the Account Type Identification Unit 30 that can include a look up table or the like. The Account Type Identification Unit 30 receives an account number or similar information from the Callers 15a to 15n and determines which predetermined menus should be presented to those Callers 15a to 15n. The Account Type Identification Unit 30 determines this by, for example, matching account information with the account number, checking historical account information and the like. The Memory Unit 35 can include various types of memory storage devices, for example, one or more databases. Memory unit 35 can store, for example, information associated with menus and the like. The components of FIG. 1 may be implemented through hardware, software, and/or firmware. Further, the number, presence and organization of components in the VRU system 100 is not limited to what is illustrated. Rather, any VRU system 100 of any configuration may be used.

FIG. 2 illustrates a block diagram of a portion of the prior art VRU system 100 known in the credit card industry. In VRU system 100, a caller enters an account number or other identifier that exists or is converted to exist using a data base, a look up table or the like to an account type identifier in an Identification Of Account Type For Caller step 102. Account type identifiers could include the credit type of the caller (e.g., low risk, high risk, secured, and young adult), whether there is a charge off on the account and how much (e.g., dollars charged off and ratio of dollars charged off to credit limit), whether the caller is a skip (e.g., valid phone number or no valid phone number) or any other appropriate information.

The account type identifier is then used by Processing Unit 25 to select what menus are to be provided to the caller via the Response Unit 20 in a Menu Selection By Account Type step 104. The caller is then directed into the Selected Main Menu 106. The Selected Main Menu 106 provides the caller with certain options that can be selected, for example, by pressing a number on the telephone keypad or through a spoken command using voice recognition software. Based on the caller's responses, the caller will be directed into one of several Sub-Menus 108-1 to 108-N+1. The Sub-Menus 108-1 to 108-N+1 will provide the caller with further menus or may direct the call to a customer representative or the like.

The available menus are organized such that high volume calls are handled so as to minimize costs and to increase customer satisfaction. Low volume calls are grouped with the closest associated high volume call group that includes all of the desired menus. The caller typically ignores any extraneous menus.

Additional menus are not set up for low volume calls for several reasons. First, the need for additional programming to set up the menus increases cost of the VRU system 100. These costs include identifying the need for a new menu, creating the menu and implementing it on the VRU system 100. Second, implementation of low call volume menus would slow the handing of calls because of the increased processing time. Third, the low volume of low volume calls means that small increases in efficiency for the low volume calls do not produce much in the aggregate for such calls and any deleterious effects upon the overall VRU system 100 could actually be counter-productive in terms of cost or customer satisfaction. Fourth, every menu represents an additional risk that the VRU system 100 may crash or have other problems. For example, frequent changes introduce increased risk to platform stability. These risks occur during including development and testing. The result of a risk realizing itself as a problem may be the lose of the entire platform or may cause inconvenience to the customer in some way. Fifth, the VRU system is complex system which may be required to handle over one million customer calls a day and over a quarter billion calls per year. This call volume makes interaction with databases and call routing a complicated technical challenge due to the interdependency of the systems. During the entire process of changing the VRU system, the corporate image, presentation and usability of the interface must be maintained. Thus, every change made to the VRU system carries enormous potential impacts and must be carefully weighed and considered.

The extraneous menu items confuse some of the low volume callers and results in customer representatives spending time with the customers to clear up the confusion. This has been considered de minimus since the low call volume can be cheaply and easily handled by customer service representatives. What was previously unrecognized was that some times these extraneous menus create a pervasive confusion that requires substantial amount of customer service time to correct. Thus, the presentation of certain options to certain customers has a disproportionate impact on efficiency and customer satisfaction.

This situation occurs with non-bankruptcy reaffirmation (NBR) accounts, accounts that are greater than 30 days in arrears, similar accounts or other accounts unrelated to accounts in to default. In the prior art VRU system 100 of FIG. 2, the Main Menu 106 can be, for example, a High Response Main Menu 200 as shown in FIG. 3. The options that can be selected on the High Response Main Menu 200 include, but are not limited to:

1: Automated Options;
2: Credit Limit Increase;
3: Lost/Stolen Cards or Close Account;
4: Customer Relations Questions;
5: Repeat Options; and
6: Change Messaging to Spanish.

Customers in financial difficulties such as those with NBR accounts or those with accounts in arrears immediately see the possibility of additional credit as something they want and need (e.g., access to more credit). Thus, a larger percentage of such callers attempt to increase their credit limits, for example, by selecting option 2. However, the financial difficulty experienced by those customers likewise disqualifies them from credit limit increases. This must often be explained at length (e.g., often taking 10 minutes or longer—several times a typical customer service phone call) and may upset the caller.

To further complicate the problem, the Sub-Menus 108 of the High Response Main Menu 200 of FIG. 3 may include a balance transfer option. Again, those callers with NBR accounts see Balance Transfers as something the callers want and need (e.g., getting rid of other creditors or avoiding late fees and interest). For example, as shown in FIG. 4, an Automated Options Sub-Menu 300 of the High Response Main Menu 200 might include, but is not limited to:

1: Balance Inquiry;
2: Current transactions;
3: Balance Transfer;
4: Statement Request;
5: Repeat Options; and
6: Return to NBR Main Menu.

Thus, a larger percentage of such callers attempt to balance transfer. However, the financial difficulty experienced by those customers likewise disqualifies them from balance transfers. Again, this must often be explained at length (e.g., often taking 10 minutes or longer—several times a typical customer service phone call) and may upset the caller.

Figure 5:
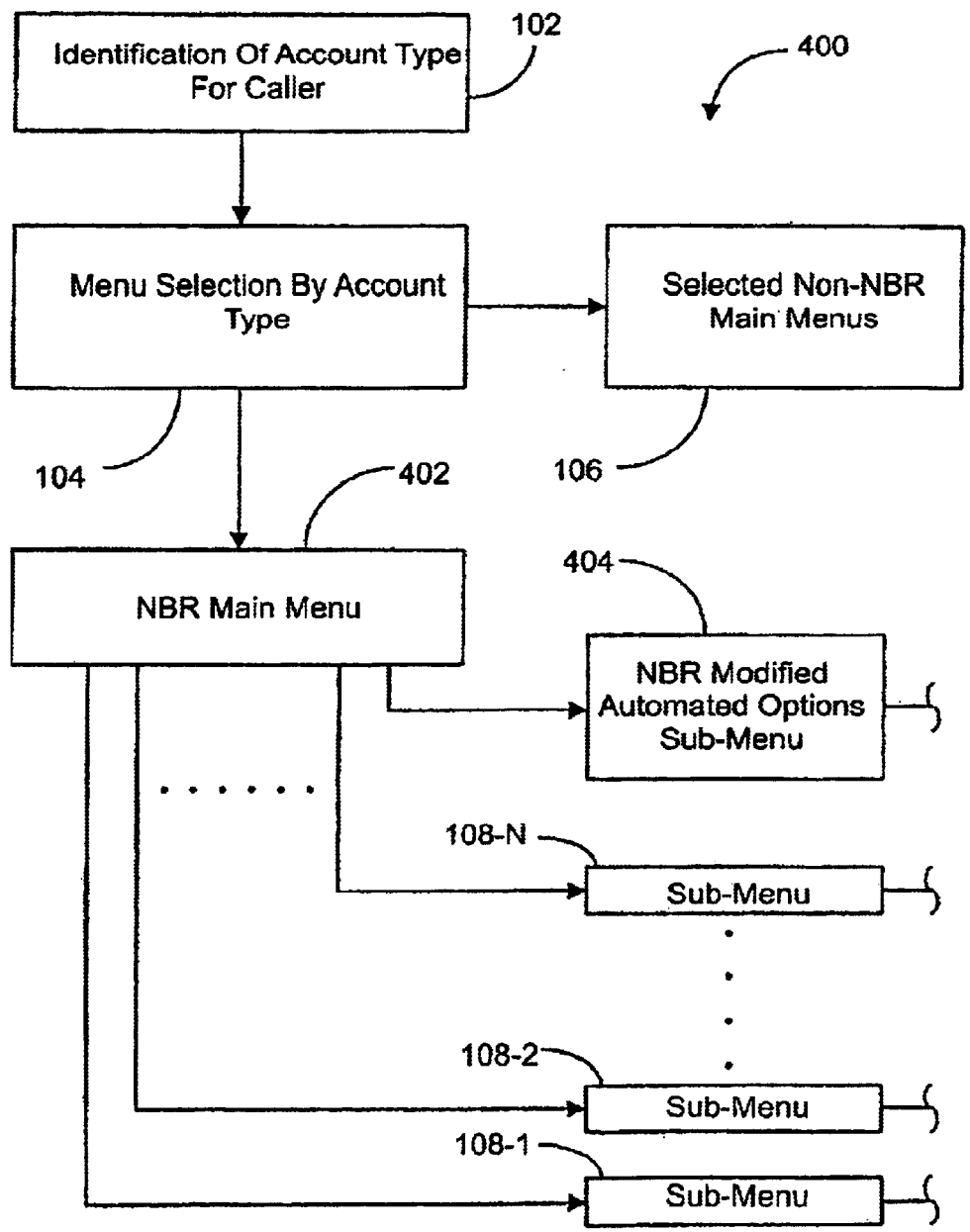
FIG. 5 illustrates a block diagram of a portion of a VRU system according to an exemplary embodiment of the present invention.

FIG. 5 illustrates a block diagram of a portion of a VRU system 400 according to an exemplary embodiment of the present invention. This VRU system 400 operates substantially the same as the VRU system 100 of FIG. 2 except that NBR accounts and the like are associated with separate menus. For example, the Menu Selection By Account Type step 104 is similar to step 104 shown in FIG. 2 and has at least one additional choice, a NBR Main Menu 402. NBR accounts are identified by the VRU system by using various account attributes/identifiers such account status (e.g., open, closed, closing, charged off), account type (VIP, secured, deceased, restricted, bankrupt), billing hierarchy, bad rate scores, available credit, the date the account opened, the language of account holders and others. The exact attributes/identifiers used to identify an NBR account will depend upon the particular VRU system/service. If the account is not an NBR account or similarly classified account, an appropriate Non-NBR Menu is automatically selected by the VRU system 100 according to the account type from the available Non-NBR Menus 106 in Memory Unit 35. The Non-NBR Menus 106' can be identical to the Selected Main Menus 106 of FIG. 2 or could be modified. If the account is an NBR account or similarly classified account, the NBR Main Menu 402 is selected and provided to the caller via VRU system 100.

Figure 6:
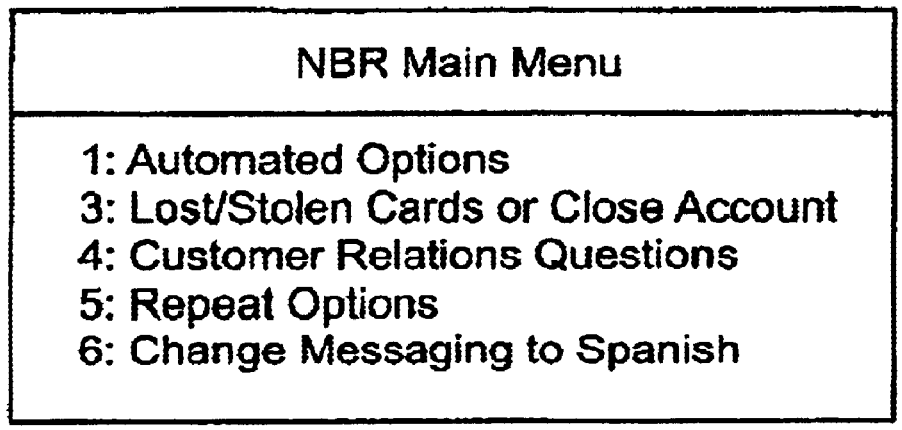
FIG. 6 illustrates an exemplary embodiment of the NBR Main Menu according to the present invention.

FIG. 6 illustrates an exemplary embodiment of the NBR Main Menu 402 according to the present invention. The NBR Main Menu 402 includes the options of the High Response Main Menu 200 of FIG. 3 except that the credit limit increase option has been eliminated. Alternatively, other options may be included.

Figure 7:
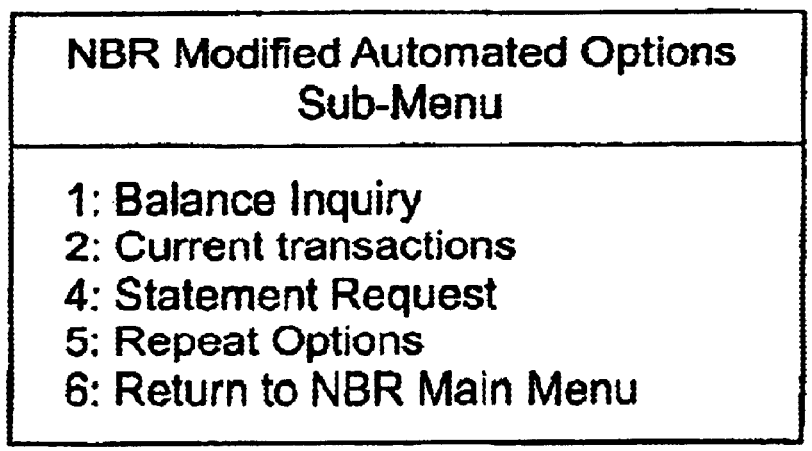
FIG. 7 illustrates an exemplary embodiment of the NBR Modified Automated Options Sub-Menu.

FIG. 7 illustrates an exemplary embodiment of the NBR Modified Automated Options Sub-Menu 404 provided to the caller via VRU system 100 upon the caller selecting option 1. The NBR Modified Automated Options Sub-Menu 404 includes the options of the Automated Options Sub-Menu 300 of FIG. 4 except that the balance transfer option has been eliminated. Alternatively, other options may be included.

The exclusion of the credit limit increase and the balance transfer options from NBR accounts or similarly classified accounts help reduce or eliminate customer confusion. This eliminates the associated customer dissatisfaction and reduces costs. The cost saving is greatly disproportionate to the number of these calls because of the inordinate amount of additional time these calls mandate.

The present invention may also be applied to any other types of calls having similar problems. The present invention may also be applied to accounts other than credit card accounts and also may be applied to any other VRU systems. For example, bank cards, brokerage accounts, cable TV, airlines, insurance companies and the like. The options of the menus described in the present invention may include any type and number and are not limited to those discussed herein.

Although several embodiments of the present invention and its advantages have been described in detail, it should be understood that changes, substitutions, transformations, modifications, variations, permutations and alterations may be made therein without departing from the teachings of the present invention, the spirit and the scope of the invention being set forth by the appended claims.

What is claimed is:

1. A menuing method for a voice response unit system comprising:

receiving an identifier associated with a caller;

identifying the caller and an associated account based on the identifier;

determining whether the identifier caller has demonstrated financial difficulty including determining an account identifier associated with the account, and determining whether the identifier account is at least one of a non-bankruptcy reaffirmation account based on the account identifier and an account that is at least a predetermined number of days in arrears based on the account identifier; and automatically presenting a menu to the caller, the menu excluding at least one menu option that would be presented to another caller not demonstrating financial difficulty, if it is determined that the caller has demonstrated financial difficulty, the at least one menu option including an increasing credit limit option or a transferring balance option if the account identifier is associated with the at least one of the non-bankruptcy reaffirmation account and the account that is at least the predetermined number of days in arrears.

* * * * *